Figure 1:
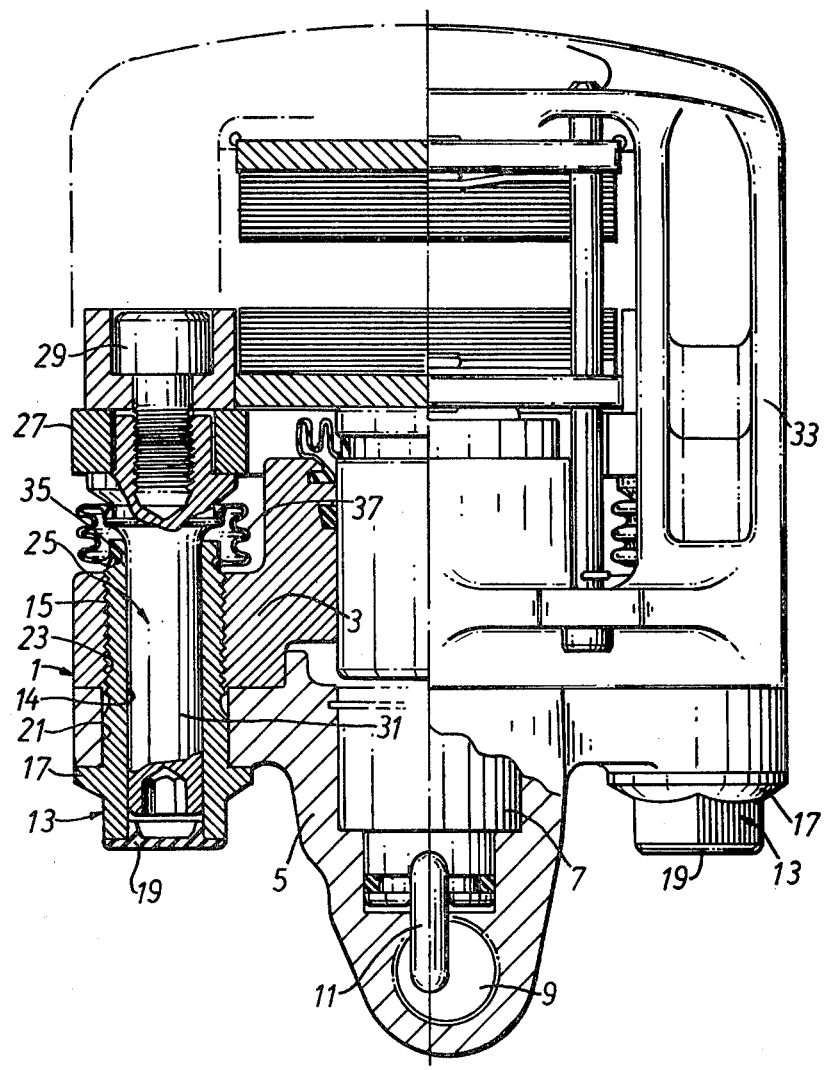

United States Patent [19]

Anderson

[11] Patent Number: 4,465,164
[45] Date of Patent: Aug. 14, 1984

[54] PIN SLIDING DISC BRAKE
[75] Inventor: Robert A. Anderson, Solihull, England
[73] Assignee: Lucas Industries Limited, Birmingham, England
[21] Appl. No.: 351,423
[22] Filed: Feb. 23, 1982
[30] Foreign Application Priority Data Mar. 3, 1981 [GB] United Kingdom ................. 8106573

[51] Int. Cl.³ .......................... F16D 65/18; B25G 3/36
[52] U.S. Cl. .............................. 188/73.44; 188/73.45; 188/73.47; 403/337; 403/408; 411/395
[58] Field of Search ............... 188/73.44, 73.45, 73.47, 188/71.1, 72.4, 72.7, 72.8, 73.31, 72.5, 73.33, 73.39, 250 F, 250 B; 403/337, 408; 411/395

[56] References Cited
U.S. PATENT DOCUMENTS

| 3,044,584 | 7/1962 | Thompson | 403/408 |
| 3,937,304 | 2/1976 | Brix | 188/72.5 |
| 4,189,032 | 2/1980 | Farr | 188/73.44 |
| 4,342,380 | 8/1982 | Melinat | 188/73.31 |
| 4,342,382 | 8/1982 | Rath et al. | 188/73.45 |
| 4,365,695 | 12/1982 | Rath | 188/73.45 |

FOREIGN PATENT DOCUMENTS

| 2548927 | 5/1976 | Fed. Rep. of Germany | 188/73.44 |
| 1521762 | 4/1968 | France | 188/72.5 |

Primary Examiner—Bruce H. Stoner, Jr.
Assistant Examiner—Robert J. Oberleitner
Attorney, Agent, or Firm—Scrivener, Clarke, Scrivener and Johnson

[57] ABSTRACT

The present specification provides a caliper for use in a disc brake. The caliper has at least two body sections which are clamped together by one or more bolts, each bolt having a bore extending axially therethrough, the bores acting as pin guides for the pins secured to the torque taking member, in the complete brake. Thus only a pair of holes are required to be formed in the caliper body sections, improving the strength and rigidity of the caliper and keeping manufacturing costs to a minimum.

9 Claims, 2 Drawing Figures

PIN SLIDING DISC BRAKE

DESCRIPTION

The present invention relates to the construction of a pin sliding caliper for use in a disc brake.

With the tendency towards weight reduction, brake construction is sometimes of composite form, utilising in certain cases a combination of alloy to give weight reduction in caliper sections which are not load bearing, and cast irons etc., to give strength and durability where it is so required. A typical construction may, for example, have an alloy piston housing bolted to an S.G. iron bridge, the two parts forming the caliper member, the caliper member being slidably engaged with a cast iron torque-taking member. In an alternative construction the caliper member may have the piston housing and the bridge integrally manufactured from light weight alloy. A disadvantage with the composite housing and bridge construction is that at least two, and in some cases four bolts are required to clamp the two parts together. Also, in the aforementioned constructions of caliper member, when an automatic adjuster/parking brake facility is fitted, the caliper member may have an additional cover plate bolted to the rear of the piston housing, such that the components making up the adjuster etc., can be assembled thereupon. Thus the number of components making up the bridge, the piston housing, the cover plate and the bolts holding the components together, becomes inordinately large. Also, as bores have to be drilled and tapped for the said bolts, it will be appreciated that the cost of the brake becomes correspondingly more expensive to manufacture.

A further disadvantage that may occur when a caliper construction is wholly alloy, and in particular when the alloy provides a direct guide for the steel pin sliding connection between caliper member and torque taking member, lies in the fact that the pin guide bores may be more susceptible to wear than for example, when the steel pins are guided in cast iron bores.

The aim of the present invention is to provide a caliper construction which is not so susceptible to wear, is less expensive to manufacture, and has additional advantages over prior art constructions of a similar type.

According to the present invention there is provided a caliper for use in a disc brake, comprising at least two caliper body sections clamped together by means of a bolt which has a bore extending axially therethrough, said bore serving as a guide for a pin in the complete disc brake.

In a preferred embodiment of the present invention both the cylinder housing and an adjuster/parking brake housing, are made of light weight metal alloy and are clamped together by two hollow bolts which engage with clearance through bores in the adjuster/parking brake housing and are screw threaded into bores in the cylinder housing. These hollow bolts act as guides for axially slidable pins secured to a torque taking member of the disc brake.

Thus, the provision of the hollow bolts both reduces the number of holes required to be produced, reducing costs, and provides a steel sleeve as a pin guide, increasing guide life as compared to an alloy guide. The present invention thereby enables a composite caliper construction to have the lighter weight advantage but not the previously inherent disadvantage.

Further the present invention has a number of additional advantages. One is that the hollow bolts are of such a diameter as to conveniently provide a large thread shear area in the alloy; this being a requirement for all alloys. Another lies in the fact that a groove to retain a convoluted boot for sealing the sliding pin against extraneous matter and weathering, can be formed in the end of the or each hollow bolt obviating the previous requirement for an undercut or counterbore for this purpose.

Also, the present invention provides for easier assembly, adjustment and testing of an automatic adjuster/parking brake mechanism as referred to in the preferred embodiment, and different adjuster housings can be simply fitted to a universal piston housing to suit particular customer requirements e.g. in respect of hydraulic porting and parking brake lever position.

Figure 2:
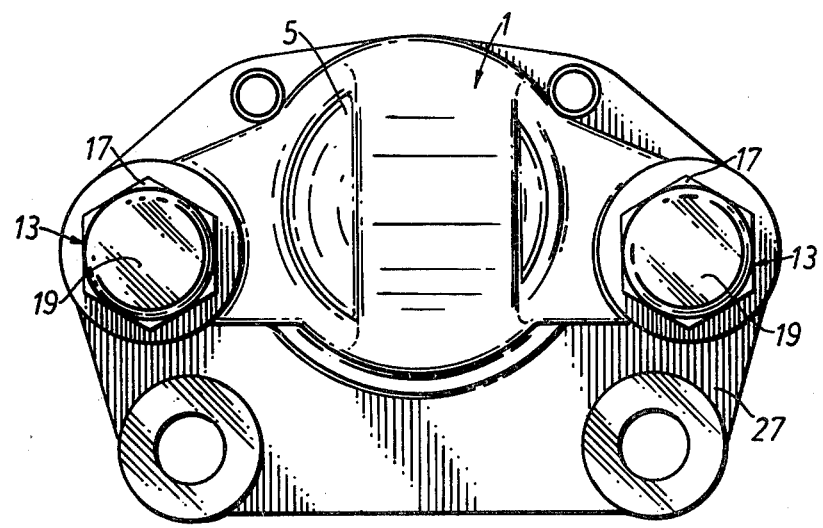

The present invention will now be further described, by way of example, with reference to the accompanying drawings, in which:

FIG. 1 is a partially cutaway sectional plan view of a preferred embodiment of the present invention installed in a disc brake; and FIG. 2 is an end elevation of the disc brake illustrated in FIG. 1.

The caliper member shown in the accompanying drawings and generally designated 1, comprises a piston housing 3 and an adjuster/parking brake housing 5 which contains an adjuster mechanism 7 (not detailed), the adjuster mechanism 7 being operable by cam 9 and strut 11.

Housings 3 and 5 are clamped together by hollow bolts 13 which are circumferentially spaced apart from each other with respect to the disc (not shown) of the complete brake. Hollow bolts 13 each have a threaded portion 15 and a flanged head portion 17 in the open end of which a protective plug 19 is located. Each bolt 13 engages through a bore 21 in the adjuster/parking brake housing and is screwed into a threaded bore 23 in the piston housing 3, the adjuster/parking brake housing being clamped between the piston housing 3 and the head portion 17 of each bolt 13.

In use, as can be seen in the cross-sectional part of FIG. 1, a pin 25 engages in the bore 14 in each hollow bolt 13 and is axially slidable therein, each pin 25 being secured to the torque taking member 27 of the brake. Whilst the pin 25 is shown in FIG. 1 as a two-part construction comprising pin bolt 29 and shaft 31, clearly the pin can alternatively be of integral construction and be simply screwed into a complementarily threaded bore in the torque taking member.

Thus by virtue of the present invention, in the embodiment illustrated, both the adjuster/parking brake housing 5 and the piston housing 3 and integral bridge 33, can be made of a suitable light weight alloy, hollow bolts 13 providing durable guides for the sliding pin 25. This construction provides for a light weight caliper member. Further, as bolts 13 act both as pin guides and also clamp the housings 3 and 5 together, the number of bores required to be drilled in the caliper is reduced as compared to prior constructions, enhancing the strength of the caliper member and reducing manufacturing costs.

The simple construction of the caliper of the present invention also provides for easier assembly, adjustment and testing of the automatic adjuster/parking brake mechanism and allows for a universal piston housing 3 to be used in many installations whilst the adjuster housing 5 can be varied to suit any particular customer requirement e.g. particular hydraulic porting and parking brake lever arrangement.

The illustrated construction (FIG. 1) provides an annular groove 35 in the end of each hollow bolt 13, which groove 35 receives and retains the sealing boot 37 which protects the sliding surface of pin 25. This obviates the necessity for undercutting or providing the caliper housing 3, 5 with a counterbore as previously required for retaining the sliding pin sealing boot. Thus manufacturing costs are again reduced.

Also, although this construction is particularly advantageous in an all alloy construction of caliper member, where good pin to bore wear characteristics are preferred, it is equally suited to a construction of, for example a cast iron piston housing in combination with an alloy parking brake housing, with the same advantages.

The present invention thus provides a lightweight caliper for a pin sliding disc brake wherein the construction is simplified and manufacturing costs reduced whilst durability and hence life, is maintained.

I claim:

1. A pin sliding disc brake comprising a caliper and a torque taking member, a sliding pin connection interconnecting said caliper and torque taking member and including a pin connected to the torque taking member, said caliper comprising at least two caliper body sections, a bolt clamping said body sections together and having a bore extending axially therethrough, said bore receiving said pin connected to the torque taking member and serving as a guide for said pin whereby said bolt serves both as a caliper clamp and also as a pin guide.

2. A disc brake according to claim 1, wherein said at least two caliper body sections are also clamped together by means of a second bolt spaced apart from said first mentioned bolt, said second bolt also having a bore extending axially therethrough.

3. A disc brake according to claim 1 or claim 2, wherein each bolt has a flanged head portion and a threaded portion.

4. A disc brake according to claim 2, wherein at least one of the caliper body sections is made of light weight metal alloy.

5. A disc brake according to claim 2, wherein a second pin is secured to said torque taking member and is received in the bore of said second bolt, both of said bolts being axially slidable in said bores.

6. A disc brake according to claim 1, wherein one body section of said caliper comprising a cylinder housing and the other section comprising an adjuster/parking brake housing.

7. A disc brake according to claim 6, wherein said caliper body sections are clamped together by two hollow bolts which engage with clearance through bores in the adjuster/parking brake housing and are screw threaded into bores in the cylinder housing.

8. A disc brake according to claim 1, wherein a removable plug closes off one end of the bore in the bolt.

9. A disc brake according to claim 1, wherein the end region of the bolt, which receives said pin, has a groove for retaining a protective boot.

* * * * *